July 29, 1941.   N. M. STEFANO   2,250,845
PATTERN CONTROLLED MULTIPLE DRILLING MACHINE
Filed Dec. 17, 1938

INVENTOR
Nicholas M. Stefano
BY
ATTORNEY

Patented July 29, 1941

2,250,845

UNITED STATES PATENT OFFICE 2,250,845

PATTERN CONTROLLED MULTIPLE DRILLING MACHINE

Nicholas M. Stefano, Endicott, N. Y., assignor to International Business Machines Corporation, New York, N. Y., a corporation of New York Application December 17, 1938, Serial No. 246,268

7 Claims. (Cl. 77—62)

This invention relates to drill templates and, more particularly, to templates of the type employed in multiple spindle drill work.

In drill work where a piece of material is to receive a multiplicity of holes, a multiple spindle drill is generally employed in order to save drilling time. Where each succeeding piece of material presented at the drilling machine is to receive the same number of holes in the same relative locations, all the drilling may be done from a common set-up of the spindles. However, when a different pattern of holes is to be made for different pieces of material as is frequently the case in practice, such as in the manufacture of panels for tabulating machine plugboards of the type disclosed in U. S. Patent 2,056,361 issued to A. W. Mills on October 6, 1936, the set-up of the drilling machine must be frequently changed.

The present invention is directed toward eliminating the necessity of changing the set-up of the drilling machine for different pieces of work and thus accomplishes a saving in time and an increase in work output. It is therefore the general object of the invention to provide a novel variable drill template to cooperate with a multiple spindle drilling machine for drilling a different pattern of holes in different pieces of material without changing the number of drills or their relative location on the drilling machine.

More specifically, it is the object of the instant invention to provide by means of yieldingly mounted drill spindles and stops or buttons in a drill template, a method for preselecting those portions of a regular pattern which are to be drilled on a multiple spindle drilling machine, and by a number of drills which is fixed for a given operation and which is less than the total number of holes to be drilled.

According to the invention, buttons made of soft steel or the equivalent are inserted in the drill template in the positions not desired to be drilled. These buttons are well lubricated and when the template is moved relatively to the drilling machine for a drilling operation, the drills which are confronted by the buttons are prevented from operating. When a drill comes in contact with a button, the button spins with the drill to prevent damage to the latter.

Further objects of the instant invention reside in any novel feature of construction or operation or novel combination of parts present in the embodiment of the invention described and shown in the accompanying drawing whether within or without the scope of the appended claims and irrespective of other specific statements as to the scope of the invention contained herein.

Figure 1:
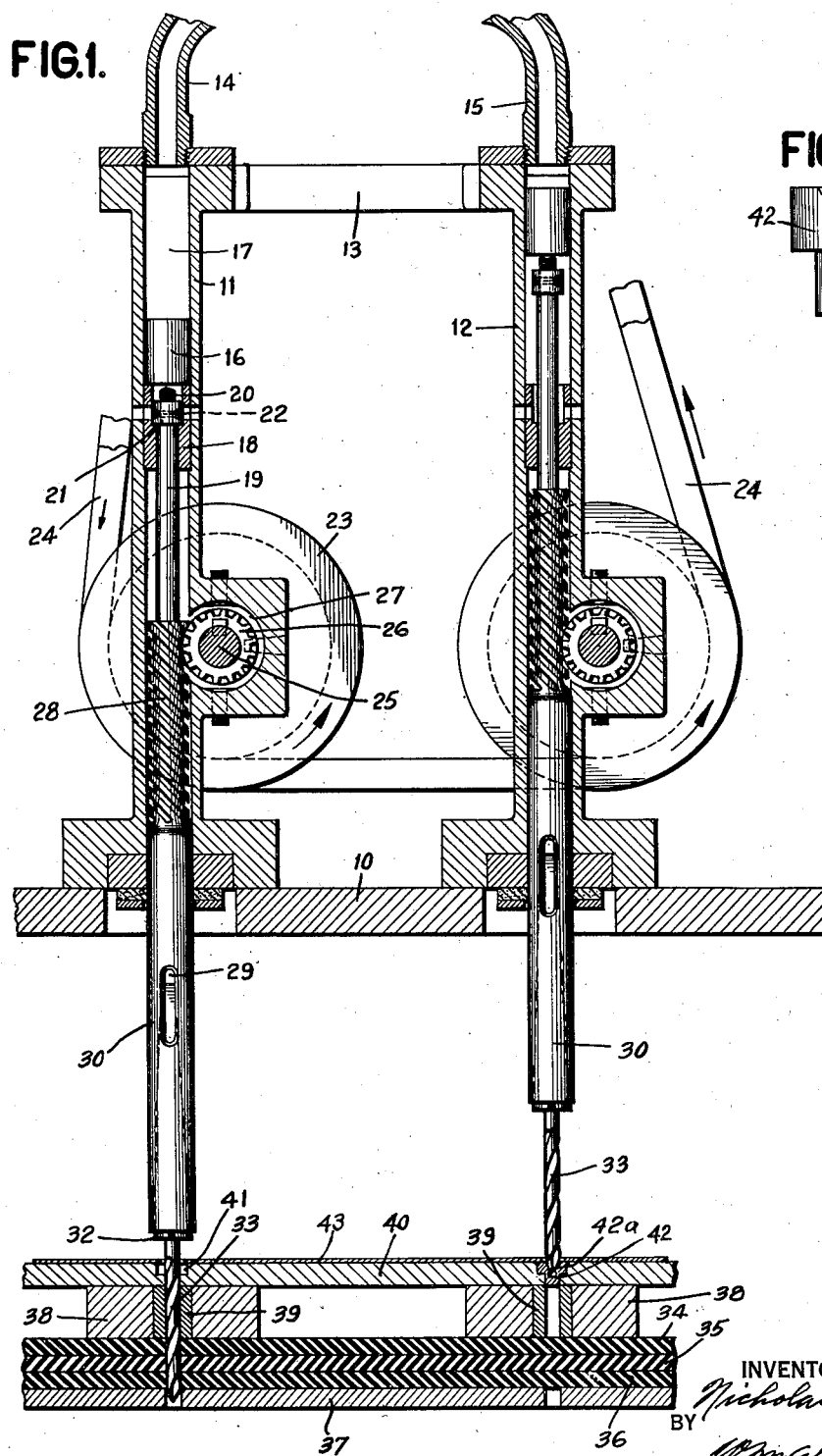
Fig. 1 is a vertical sectional view of the drill, showing the relative location of the template and material to be drilled in working relation to the drill itself.
Figure 1A:
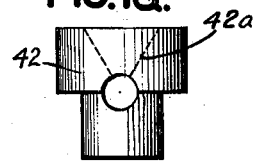
Fig. 1a is a detail view of a button or stop which is shaped to conform with the holes of the template.

The invention will now be described specifically with reference to the drawing.

The drilling machine may be of any convenient and suitable type such as that illustrated in Fig. 1. In the machine shown, the supporting frame includes a base 10 and upright members 11 and 12 joined near the top by a brace 13. The members 11 and 12 are hollow and have flexible tubes, designated 14 and 15 respectively, protruding from the tops thereof which lead to a compressed air tank (not shown). The mechanism within each of the upright members is kept under an adjustable amount of air pressure, for example, 120 lbs./square inch. As the mechanism within each of the upright members is the same, a description of that mechanism within the walls of member 11 will suffice.

A floating piston 16 rides in a cylinder 17 filled with compressed air which biases the piston downwardly against a bushing 18. The upper end of vertical shaft 19 extends into bushing 18 and is provided with a threaded portion 20 having a nut 21 which is prevented from turning off the thread 20 by a cotter pin 22.

The drive mechanism for shaft 19 includes a drive pulley 23 driven in the direction shown by a belt 24 connected to a suitable motor (not shown). A drive shaft 25 is directly connected with the pulley 23 and is provided with a helical gear 26 which meshes with a helical gear 28 on the floating spindle assembly 30. A bearing 27 is provided to take up the end thrust. The lower end of shaft 19 is merged with the spindle assembly 30 and thus shaft 19 and the spindle 30 are kept in continuous rotation. A collet 32 is provided for holding the drill 33 in position. An elongated hole 29 is usually provided in the spindle so that a drill which has become dull may be removed by forcing a wedge in this hole against the top of the drill.

The work to be drilled, represented by panels 34, 35, and 36 is placed on a drilling fixture 37 located beneath the drills 33. Immediately above the work is placed a pressure pad 38 with inserted drill bushings 39. A template 40 is then placed over the pressure pad 39 so that the holes 41 in the template align with the bushings 39. These holes are of smaller diameter at the bottom than at the top, the smaller diameter being slightly larger than the diameter of the bushings 39. The template holes are formed to readily receive T-shaped buttons or stops 42. After buttons 42 have been dropped in the required template holes 41, a button retainer plate 43 is placed over the template 40. The buttons are confined within the holes of the template by reason of the fact that plate 43 is provided with holes of slightly smaller diameter than the top of the buttons.

Provision is made for moving the template assembly vertically with the pressure pad 38 during the drilling operation and laterally with the movement of the work and the drilling fixture 37 to a new drilling position. A large number of drills may be provided each with an individual air cylinder and common drive mechanism as previously described. For purposes of illustration, two such drills 33 are shown in the drawing. The drill 33 shown toward the left-hand side of Fig. 1 has found an open hole in the template and has performed a normal drilling operation through the panels 34, 35, 36, and into the drilling fixture 37. The drill 33 on the right-hand side of this figure, however, has encountered one of the buttons 42 and is held forced back up against the air pressure.

The button 42 is well lubricated by any suitable means such as an oil and graphite mixture and therefore is adapted to rotate freely in the hole 41.

A small conical recess 42a is provided in the top of the button into which the drill fits. This hole furnishes the double purpose of aiding in the alignment of the drill and of preventing injury to the drill by insuring that the button rotates with the drill. Button 42 is preferably made of a soft grade of steel although other materials may be used as well. As the template assembly is moved upwardly toward the drill 33, the button contacts the drill and forces it upward against the air pressure in the cylinder 17 above it. Thus the drill 33 on the right is rendered ineffective to drill a hole in that particular location in the panels 34, 35, and 36.

It is noted that the buttons may be inserted in accordance with a desired pattern of holes, and then when the pattern is to be changed the button retainer plate is quickly removed and a few more buttons added or removed, as the case may be, the number of drills remaining fixed.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a drilling machine, in combination with a plurality of rotating drills, yieldable means cooperating with the drills for urging said drills toward a piece of work to be drilled to effect drilling operations in said work, a template having a plurality of holes and a plurality of rotatable portions adapted to be positioned between the drill and the work so that a predetermined number of the drills are aligned with said holes and others of said drills are aligned with said rotatable portions, the last-mentioned drills during drilling operations engaging the rotatable portions so as to prevent contact between the drill so engaged and the work in spite of the urging of the yieldable means.

2. In a drilling machine, in combination with a plurality of constantly rotating drills, a plurality of pistons cooperating with said drills, a series of cylinders in which said pistons operate, a source of air under pressure, means for applying said air to the pistons in said cylinders so as to urge said pistons against said drills to cause the drills to contact the work for drilling operations, a template having a plurality of holes and a plurality of rotatable portions adapted to be positioned between the drills and the work so that a predetermined number of the drills are aligned with the holes and others of said drills are aligned with the rotatable portions, the last-mentioned drills in the course of being pressed into contact with the work by the applied air pressure engaging said rotatable portions so as to force said pistons upwardly in said cylinders thus preventing further relative movement of the drills so engaged and the work.

3. In combination, a drilling machine comprising a plurality of rotating drills, biasing means to impart relative movement of the drills with respect to the work to be drilled during drilling operations, a template having a plurality of holes therein adapted to be positioned between the drills and the work so that each of said drills is aligned with one of the holes in the template, and a plurality of stops insertibly placed in a predetermined number of said holes with which the related drills engage to prevent further relative movement of the drills so engaged with respect to the work while the drills not so engaged continue relatively toward the work to effect drilling operations.

4. A drilling machine comprising a plurality of rotating drills in constant rotation, biasing means to impart relative movement between the drills and the work to be drilled during drilling operations, a template having a plurality of holes therein adapted to be positioned between the drills and the work so that each of said drills is aligned with one of the holes in the template, a plurality of stops insertibly placed in a predetermined number of said holes and freely rotatable therein, said stops being provided with recesses with which the points of the drills engage to prevent further relative movement between the drills so engaged and the work by overcoming the effect of the biasing means, the last-mentioned drills upon engaging said stops causing the latter to rotate with the said drills.

5. In a drilling machine in combination with a plurality of drills, yieldable means cooperating with the drills for urging them toward the work to be drilled to effect drilling operations, a template having a plurality of holes therein adapted to be positioned between the drills and the work so that each of the drills is aligned with a hole in the template, a plurality of buttons having conically shaped recesses therein and adapted to be insertibly placed in said holes in accordance with a preselected pattern, those drills aligned with holes having buttons therein in the course of drilling operations engaging said recesses in the buttons so as to hold the said drills from further relative movement by the aforesaid yieldable urging means.

6. A drilling machine comprising a plurality of drills in constant rotation, yieldable biasing means for said drills to impart relative movement between the drills and the work to be drilled, a template provided with a plurality of holes, means to position the template between the work and the drills so that said holes lie in a path of said drills, a plurality of buttons of a shape substantially in conformity with the shape of the holes adapted to be inserted therein, the holes with stops when engaged by the related drills in the course of their relative movement toward the work during drilling operations interrupting said relative movement of the drills and causing said buttons to turn in the holes in accordance with the rotation of the drill, and the holes without stops when engaged by the related drills aligning said drills in their relative movement toward the work to effect drilling operations.

7. In a drilling machine in combination with a plurality of constantly rotating drills, yieldable means cooperating with the drills for urging them toward the work to be drilled to effect drilling operations, a template having a plurality of holes and a plurality of rotatable portions therein, the rotatable portions being made of material substantially softer than the drills and provided with conically shaped recesses therein, means to position the template between the work and the drills so that a preselected number of the holes in the template and the recesses in the rotatable portions lie in the path of said drills, the drills which engage said recesses being interrupted in the course of their attempted movement toward the work under the urging of the yieldable means, and the drills which engage the holes in the template remaining against the projection and continuing their relative movement toward the work to effect a drilling operation.

NICHOLAS M. STEFANO.